United States Patent [19]

Takazawa et al.

[11] Patent Number: 4,603,080
[45] Date of Patent: Jul. 29, 1986

[54] MAGNETIC RECORDING MEDIA COMPRISING FINE PARTICLES OF ORGANOSILICA GEL IN THE MAGNETIC RECORDING LAYER

[75] Inventors: Yosuke Takazawa, Yamato; Yasuo Mukai, Yokohama, both of Japan

[73] Assignee: Victor Company of Japan, Limited, Japan

[21] Appl. No.: 662,078

[22] Filed: Oct. 18, 1984

[30] Foreign Application Priority Data

Oct. 19, 1983 [JP] Japan .................................. 58-195693

[51] Int. Cl.$^4$ ................................................ G11B 5/70
[52] U.S. Cl. .................................. 428/331; 252/62.54; 360/134; 360/135; 360/136; 427/128; 428/328; 428/329; 428/694; 428/900
[58] Field of Search ............... 428/695, 694, 900, 329, 428/328, 403, 405, 407; 427/131, 128, 132; 252/62.54; 360/134, 135

[56] References Cited

U.S. PATENT DOCUMENTS

| 2,657,149 | 10/1953 | Iler | 423/335 |
| 4,280,918 | 7/1981 | Homola | 252/62.53 |
| 4,320,159 | 3/1982 | Ogawa | 428/900 |
| 4,438,156 | 3/1984 | Homola | 427/128 |

FOREIGN PATENT DOCUMENTS 48-101907 12/1973 Japan .
1431854 4/1976 United Kingdom .

*Primary Examiner*—Ellis P. Robinson
*Attorney, Agent, or Firm*—Lowe, Price, LeBlanc, Becker & Shur

[57] ABSTRACT

A magnetic recording medium comprising a non-magnetic support and a magnetic recording layer formed on at least one side of the support, the magnetic recording layer being made of a cured mixture of magnetic particles and an organosilica gel bearing isopropyl end groups dispersed in thermosetting resin binders.

3 Claims, No Drawings

MAGNETIC RECORDING MEDIA COMPRISING FINE PARTICLES OF ORGANOSILICA GEL IN THE MAGNETIC RECORDING LAYER

BACKGROUND OF THE INVENTION

1. Field of the Invention

This invention relates to the art of magnetic recording and reproducing system and more particularly, to magnetic recording media for use in such systems.

2. Description of the Prior Art

In order to impart high durability and good travelling performance to magnetic recording media, it is the usual practice that the magnetic recording layer formed on bases or substrates is made of a magnetic recording composition which comprises a magnetic powder and abrasive particles dispersed in thermosetting polymer binders. The abrasive particles used for these purposes are usually made of inorganic materials such as alumina and have a size of about 0.5 μm in a minimum. When such large-size particles are dispersed in thermosetting polymer binders and the dispersion applied onto substrates is thermally cured, a high strength recording layer is not obtained because of the rather poor affinity of the inorganic particles for the thermosetting polymer binder and the large size of the particles. Accordingly, satisfactorily high durability of the recording layer cannot always be obtained.

Magnetic discs of the type which is used in magnetic disc apparatus and, particular, Winchester-type magnetic disc apparatus in which the magnetic head is in contact with a magnetic disc surface when the apparatus is not operated and the magnetic head is lifted out of the disc surface when the disc is rotated at high speed should have good mechanical characteristics of the film layer such as high abrasive resistance, high impact resistance and the like.

SUMMARY OF THE INVENTION

It is therefore an object of the present invention to provide magnetic recording media which make use of a specific type of organosilica gel, as a filler, which has high affinity for thermosetting resin binders and is in the form of powder having a very small size whereby the resulting medium has improved durability.

It is another object of the invention to provide magnetic recording media which comprises a magnetic recording layer having much improved mechanical strength.

In accordance with the prsent invention, the magnetic recording layer is made of a magnetic recording composition which comprises a magnetic powder and primary particles of an organosilica gel dispersed in a thermosetting resin binder. The organosilica gel shows good affinity for various solvents covering from hydrophilic to hydrophic solvents. The organosilica gel used in the present invention is a product obtained by subjecting colloidal silica to condensation reaction with isopropyl alcohol at silanol groups thereof, thus having end group units of the formula,

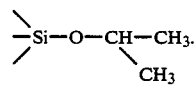

This organosilica gel can be readily dispersed in solvents as primary particles without coagulation as in the case of inorganic particles.

DETAILED DESCRIPTION AND PREFERRED EMBODIMENTS OF THE INVENTION

The term "magnetic recording media" used herein means all magnetic recording media known to the art, including magnetic tapes, magnetic discs, magnetic cards and the like.

The magnetic recording media of the present invention have a magnetic recording layer formed on at least one side of a support or substrate. The magnetic recording layer is made of magnetic particles and primary particles of a organosilica gel dispersed in or throughout a thermosetting resin binder.

The organosilica gel useful in the practice of the invention is colloidal in nature and is obtained by partially etherifying silanol groups of silica gel with isopropyl alcohol, so that the resulting organosilica gel is imparted with a degree of hydrophobicity. Such gel is obtained by subjecting silica sol to condensation reaction with isopropyl alcohol. By the condensation reaction, the silanol groups of silica are rendered hydrophobic. The condensation reaction can be represented by the following formula,

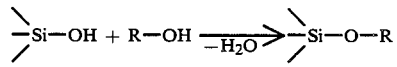

in which R is $(CH_3)_2$—CH—group.

Thus, the silanol end groups are etherifying and show good affinity for various organic solvents. The $(CH_3)_2$—CH— group is introduced into the organosilica gel in amounts of about 10% or less on the weight basis and can thus be well dispersed in various organic solvents as primay particles. The organosilica gel useful in the present invention has the following physical properties.

| | |
|---|---|
| Bulk density (g/cc) | 0.836 |
| Primary particle size | 10–20 mμ |
| Particle size | over 50 μ |
| Content of SiO₂ | over 90% |
| Disperability in tolune | yes |
| Transparency of dispersion | good |

The organosilica gel has much higher affinity for thermosetting resins than inorganic fillers ordinarily used in the field of magnetic recording art and the resulting magnetic recording layer becomes more durable.

It should be noted that the organosilica gel comprising isopropyl end groups is completely different in nature from silica gel whose end groups are represented by

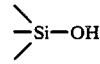

and an organosilica gel, known as Aerosil, in which the end groups are represented by

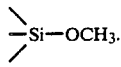

In particular, the organosilica gel called Aerosil has a bulk density as small as about 0.06—0.09 and a content of $SiO_2$ over 98 wt% and is not dispersable in toluene but may settle when added in amounts over 10% in organic solvents.

The organosilica gel of the invention is dispersable in the form of primary particles with a size as small as 10 to 20 mu in hydrophobic organic solvents including aromatic hydrocarbons such as toluene, ketones such as acetone, ethers such as tetrahydrofuran and mixtures thereof. In practical applications, the gel may be used in the form of sols dispersed in various dispersion mediums including alcohols such as methyl alcohol, ethyl alcohol, n-propyl alcohol, isopropyl alcohol, n-butyl alcohol, pentanol, ethylene gylcol, glycerine and the like, ethers such as ethyl cellosolve, amides such as dimethylformamide, and the like. These organosilica sols may be miscible with various solvents including water, alcohols such as methyl alcohol, ethyl alcohol, n-butyl alcohol and the like, hydrocarbons such as heptane, aromatic hydrocarbons such as toluene, acetates such as butyl acetate, ketones such as methyl ethyl ketone, and the like.

The organosilica gel of the invention is generally added to a magnetic recording composition in amounts up to 35 wt%, preferably from 5 to 35 wt% and most preferably from 10 to 30 wt%, of the composition on the solid basis.

Magnetic particles used in combination with the organosilica gel may be of any types ordinarily used for these purposes, including particles of ferromagnetic iron oxide materials such as gamma-$Fe_2O_3$ and $Fe_3O_4$ with or without additional metals such as Co, ferromagnetic metals such as Fe, and alloys thereof such as Fe-Co, Fe-Ni, Fe-Co-Ni and the like. In addition, other ferromagnetic materials such as $CrO_2$ may also be used. These materials may be used singly or in combination as usual. The particles of these materials have usually an average size of from 0.02 to 0.5 μm. The magnetic particles are used in amount of 20 to 70 wt% of the total solid composition.

The thermosetting resins used in the present invention include, for examole, phenolic resins, epoxy resins, curable polyurethane resins, urea resins, melamine resins, alkyd resins, silicone resins, urea-formaldehyde resins, mixtures of isocyanates and polyols, and the like. There resins may be used singly or in combination. As a matter of course, suitable curing agents may be used in combination with these thermosetting resins, if necessary.

The solvents for the binder resin may depend on the types of organosilica gel or sol and thermosetting resin and are, for example, aromatic hydrocarbons such as toluene, alcohols such as n-butyl alcohol, ketones such as methyl isobutyl ketone and the like, and mixtures thereof.

Supports suitable for the purposes of the present invention include films, foils, plates, or sheets of a variety of materials including, for example, synthetic or semi-synthetic resins such as polyesters, polyolefins, cellulose derivatives and the like, metals such as aluminium, copper and the likes, and glasses and ceramics.

In the production of the magnetic recording media, a magnetic paint which comprises a uniform mixture of magnetic particles and an organosilica gel bearing isopropyl end groups dispersed in a thermosetting resin binder is prepared and applied onto a base or support in a predetermined thickness, which depends on the type of magnetic recording medium, followed by baking and curing at temperatures of 50° to 250° C. The baking temperature may, more or less, vary depending on the type of resin used.

The present invention is more particularly described by way of examples.

EXAMPLE 1

| | |
|---|---|
| Gamma-$Fe_2O_3$ | 40 parts by weight |
| Epoxy resin | 28 |
| (Epikote 1007, by Shell Inc.) | |
| Phenolic resin | 12 |
| (PC-25, by Sumitomo Bakelite Co., Ltd.) | |
| Organosilica gel | 20 |
| (Shokubai Chem. Ind. Co., Ltd.) | |
| Iso-propyl alcohol | 100 |
| Toluene | 100 |

A composition of the above formulation was placed in a ball mill and mixed for 24 hours. While rotating a base for magnetic disc, the resulting magnetic paint was spin-coated on the base. The coated base was baked at 200° C. for 1 hour to cure the thermosetting resins. Subsequently, the disc surface was polished and applied with a lubricant to obtain a magnetic disc.

Comparative Example 1

The general procedure of Example 1 was repeated using alumina powder having a size of 0.5 μm instead of the organosilica gel, thereby obtaining a magnetic disc.

EXAMPLE 2

| | |
|---|---|
| Gamma-$Fe_2O_3$ | 40 parts by weight |
| Epoxy resin | 32 |
| (Epikote 1004, by Shell Inc.) | |
| Melamine resin | 8 |
| (Super Beckamine 820, by Dainippon Ink Co., Ltd.) | |
| Organosilica gel | 20 |
| (Shokubai Chem. Ind. Co., Ltd.) | |
| Isopropyl alcohol | 100 |
| Toluene | 100 |

The general procedure of Example 1 was repeated using the above formulaion, thereby obtaining a magnetic disc.

Comparative Example 2

The general procedure of Example 2 was repeated using alumina powder instead of the organosilica gel, thereby obtaining a magnetic disc.

EXAMPLE 3

| | |
|---|---|
| Gamma-$Fe_2O_3$ | 40 parts by weight |
| Phenolic resin | 32 |
| (Priophene TD-447, By Dainippon Ink Co., Ld.) | |
| Polyvinyl butyral resin | 8 |
| (Eslec BM-2, by Sekisui Chem. Co., Ltd.) | |
| Organosilica gel | 20 |

-continued

| (Shokubai Chem. Ind. Co., Ltd.) | |
|---|---|
| Isopropyl alcohol | 100 |
| Toluene | 100 |

The general procedure of Example 1 was repeated using the above formulation, thereby obtaining a magnetic disc.

Comparative Example 3

The general procedure of Example 3 was repeated using alumina powder instead of the organosilica gel, thereby obtaining a magnetic disc.

The magnetic discs obtained in the above Examples and Comparative Examples were subjected to the product testing using (the Wichester type magnetic disc machine) in which a contact-start-stop cycle was repeated until the magnetic recording layer of each disc was observed to be broken. The results are shown in Table below.

TABLE

| Disc | Contact-start-stop cycles before breakage |
|---|---|
| Example 1 | 26,000 |
| Example 2 | 25,000 |
| Example 3 | 22,000 |
| Comparative Example 1 | 18,000 |
| Comparative Example 2 | 16,000 |
| Comparative Example 3 | 15,000 |

As will be seen from the above results, the magnetic discs having the magnetic recording layers obtained from the paints of Examples 1 through 3 comprising the organosilica gel are superior in the above durability test to the discs of Comparative Examples 1 through 3 using alumina.

Similar results are obtained when magnetic recording compositions of the present invention are applied to magnetic tapes and the like.

What is claimed is:

1. A magnetic recording medium which comprises a non-magnetic support and a magnetic recording layer formed on at least one side of the support, said magnetic recording layer being made of from 20 to 70 wt% of magnetic particles and as a filler, from 5 to 35 wt% of primary particles, having a size of 10 to 20 mu, of an organosilica gel bearing isopropyl end groups, which are dispersed in a cured thermosetting resin binder.

2. The magnetic recording medium according to claim 1, wherein the isopropyl group is contained in an amount of about 10 wt% of the organosilica gel.

3. The magnetic recording medium according to claim 1, wherein said medium is a magnetic disc.

* * * * *